UNITED STATES PATENT OFFICE.

JOSEPH JULES ADOLPHE CROLBOIS, OF PARIS, FRANCE.

PROCESS OF MAKING CATTLE FOOD.

1,001,253.   Specification of Letters Patent.   Patented Aug. 22, 1911.

No Drawing.   Application filed August 10, 1910.   Serial No. 576,565.

*To all whom it may concern:*

Be it known that I, JOSEPH JULES ADOLPHE CROLBOIS, of 82 Rue de la Pompe, in the city of Paris, Republic of France, engineer, have invented a Process of Treating Vegetable Matters for Producing Cattle Food, of which the following is a full, clear, and exact description.

The pulps of beet-roots, issuing from sugar-works and distilleries, and intended for the feeding of cattle, are generally kept in silos, where they are subjected to a spontaneous fermentation in which are contained the butyric ferments and the entire series of the putrid ferments. These butyric and putrid fermentations give to these pulps a very characteristic odor; moreover, they greatly alter, by decomposing them, the nutritive matters which these pulps contain and diminish in great proportions the alimentary power of the latter. Finally, the products of these fermentations are toxicants for young animals; they determine disorders in the latter and often cause death.

The present invention has for its object a process for the treatment of these pulps, completely remedying these various disadvantages.

This process consists essentially in introducing in these pulps, before their ensilage, a special ferment which has been previously acclimated in the medium in which it is intended to propagate. This special ferment is a lactic ferment which has been acclimated to the sulfuric acid and organic acids of the pulps issuing from distilleries. This ferment develops itself, in these conditions very rapidly in the matters where it has been introduced, prevents by this fact the development of the other ferments, such as the butyric and putrid fermentations above mentioned, and gives to the pulps a normal and sound fermentation. For introducing this ferment in said matters, the most simple means seems to be the pulverizer. In this case the process is effected as follows: The lactic ferment, acclimated to the sulfuric and organic acids which these pulps contain, is brought up in a pure culture in a suitable medium or surrounding. One liter of this culture liquid, which contains the ferment in full strength of reproduction, is taken and diluted with for example 10 liters of very sound water; this liquid thus diluted is introduced in the pulverizer.

The pulps are arranged in layers of four inches thick in the silos and on each layer is sprayed a certain quantity of the culture liquid diluted with water as specified above; when a layer of pulps has thus been treated another layer of pulps is placed on the top, a new charge of culture liquid is pulverized on the latter and so on; the mass of pulps is thus completely sown.

The quantity of ferment used is, of course, in proportion to the quantity of pulps to be treated.

The following method of introducing the said ferment into the pulps may also be used: The pulps are placed into a vessel, and the acclimated lactic ferment being poured on these pulps, is left to develop in this vessel. Then these pulps which contain the lactic ferment are mixed with the pulps which are ensilaged.

It is to be understood that any other method of introducing the ferment may be used.

As has been previously specified, the development of this lactic ferment in the medium of the pulps placed in the silos, prevents the butyric and putrid fermentations and gives the following advantages: 1. The pulps placed in the silos do not give forth any more bad smell and preserve their primitive state. 2. The assimilation of these pulps is complete and does not cause any digestive disorder; the alimentary power is therefore greater, so that the animals fed with these pulps fatten much more rapidly. 3. The pulps do not contain any toxic principle and consequently, are by no means injurious for the feeding of young animals.

The present process may also be applied to all other vegetable matters intended for the feeding of animals, such as grains, grass, etc.; it is to be understood that in this case, the lactic ferment must be acclimated in a medium or surrounding appropriated to that in which it is to be introduced.

Claims:

1. A process for the treatment of vegetable matters intended for the feeding of animals, consisting in introducing in these matters a lactic ferment, previously acclimated to the medium in which it must develop, for the purpose of increasing the preservation, the digestibility and the facility of assimilation of said matters and of permitting the use of the same for young animals.

2. A process for the treatment of vegetable matters intended for the feeding of animals, consisting in spraying on the said matters placed in silos in layers of small thickness, a culture liquid containing a lactic ferment acclimated to the medium in which it must develop.

Signed by me this 29th day of July, 1910.

JOSEPH JULES ADOLPHE CROLBOIS.

Witnesses:
DEAN B. MASON,
R. EHIRIOT.

---

Copies of this patent may be obtained for five cents each, by addressing the "Commissioner of Patents, Washington, D. C."